(12) United States Patent
Wale et al.

(10) Patent No.: US 11,180,113 B1
(45) Date of Patent: Nov. 23, 2021

(54) SECURITY NOTIFICATION BASED ON BIOMETRIC IDENTIFIER

(71) Applicant: Micron Technology, Inc., Boise, ID (US)

(72) Inventors: Madison E. Wale, Boise, ID (US); Bhumika Chhabra, Boise, ID (US); Claudia A. Delaney, Garden City, ID (US); Elsie de la Garza Villarreal, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/880,195

(22) Filed: May 21, 2020

(51) Int. Cl.
| | |
|---|---|
| *B60R 25/102* | (2013.01) |
| *G06F 21/32* | (2013.01) |
| *G07C 9/25* | (2020.01) |
| *G07C 5/00* | (2006.01) |
| *B60R 25/10* | (2013.01) |

(52) U.S. Cl.
CPC .......... *B60R 25/102* (2013.01); *G06F 21/32* (2013.01); *G07C 5/008* (2013.01); *G07C 9/257* (2020.01); *B60R 2025/1016* (2013.01)

(58) Field of Classification Search
CPC ..... B60R 25/00; B60R 25/10; B60R 2325/30; B60R 25/102; B60R 2025/1016; G08B 13/00; G07C 9/00563; G07C 9/257; G07C 5/008; G06F 21/32
USPC ................... 340/426.1, 5.8–5.84, 5.3, 425.5
See application file for complete search history.

(56) References Cited

U.S. PATENT DOCUMENTS

| | | | | |
|---|---|---|---|---|
| 6,898,299 | B1 * | 5/2005 | Brooks | G07C 9/37 382/115 |
| 7,138,904 | B1 * | 11/2006 | Dutu | B60R 25/02102 340/5.72 |
| 8,549,318 | B2 * | 10/2013 | White | B60R 25/04 713/186 |

(Continued)

FOREIGN PATENT DOCUMENTS

| | | |
|---|---|---|
| JP | 2007126144 A | 5/2007 |
| JP | 2016064830 A | 4/2016 |

(Continued)

OTHER PUBLICATIONS

International Application No. PCT/US2021/030956—International Search Report & Written Opinion, dated Aug. 26, 2021, 12 pages.

*Primary Examiner* — Eric Blount
(74) *Attorney, Agent, or Firm* — Perkins Coie LLP

(57) ABSTRACT

Methods and apparatuses for providing security notification based on biometric identifier are described, in which one or more biometric information of a person may be utilized to permit or prohibit the person to access the vehicle. As such, the person may not access (or operate) the vehicle without satisfying security measures based on his/her biometric identifier generated from various biological information collected from the person. When the person is not authorized to access the vehicle, the security measures may transmit a security notification to an owner of the vehicle (e.g., a mobile device of the owner, an account of the owner) such that the owner may take appropriate steps in response to receiving the security notification. Such a notification may include the biometric information of the person, other information collected from the sensing component, a set of options for the owner to select from, among others.

20 Claims, 5 Drawing Sheets

(56) References Cited

U.S. PATENT DOCUMENTS

| | | | |
|---|---|---|---|
| 9,674,184 B2* | 6/2017 | Kim | H04L 9/3231 |
| 9,972,153 B2* | 5/2018 | Frye | G07C 9/37 |
| 10,464,530 B2* | 11/2019 | Falkson | B60R 25/257 |
| 10,482,226 B1* | 11/2019 | Konrardy | B60R 21/34 |
| 10,600,270 B2* | 3/2020 | Hassani | G07C 9/00857 |
| 2004/0217850 A1* | 11/2004 | Perttunen | B60R 25/252 340/426.17 |
| 2005/0062602 A1* | 3/2005 | Fujiwara | B60R 25/102 340/539.1 |
| 2008/0252412 A1* | 10/2008 | Larsson | B60R 25/252 340/5.2 |
| 2009/0309709 A1* | 12/2009 | Bevacqua | H04W 12/126 340/426.18 |
| 2012/0242469 A1* | 9/2012 | Morgan | B60K 28/063 340/426.11 |
| 2013/0057396 A1* | 3/2013 | Winslow | B60R 25/33 340/426.19 |
| 2013/0090784 A1* | 4/2013 | Hibbert | B60R 25/08 701/2 |
| 2014/0039721 A1* | 2/2014 | Protopapas | B60R 25/25 701/1 |
| 2014/0049393 A1* | 2/2014 | Boyt | G08B 25/006 340/540 |
| 2014/0070917 A1* | 3/2014 | Protopapas | B60R 25/25 340/3.1 |
| 2014/0152422 A1* | 6/2014 | Breed | G07C 9/32 340/5.52 |
| 2014/0294180 A1* | 10/2014 | Link, II | H04W 12/06 380/270 |
| 2014/0306799 A1* | 10/2014 | Ricci | H04W 4/21 340/5.83 |
| 2016/0101783 A1* | 4/2016 | Abou-Nasr | B60R 16/037 340/5.82 |
| 2017/0282856 A1* | 10/2017 | Riedel | B60R 25/24 |
| 2018/0053034 A1* | 2/2018 | Merrell | H04L 63/0861 |
| 2019/0066424 A1 | 2/2019 | Hassani et al. | |
| 2020/0167579 A1* | 5/2020 | Boye | B60R 25/04 |
| 2020/0184227 A1* | 6/2020 | Felhi | G06K 9/00926 |
| 2020/0216022 A1* | 7/2020 | Cheng | B60R 25/102 |
| 2020/0254974 A1* | 8/2020 | Gordon | B60R 25/25 |

FOREIGN PATENT DOCUMENTS

| | | |
|---|---|---|
| KR | 20070101963 A | 10/2007 |
| KR | 102093858 B1 | 3/2020 |

* cited by examiner

SECURITY NOTIFICATION BASED ON BIOMETRIC IDENTIFIER

TECHNICAL FIELD

The present disclosure generally relates to secure access to a vehicle, and more particularly relates to providing security notification based on biometric identifiers.

BACKGROUND

Vehicles may be equipped with security measures such as mechanical locks, remote access keys, numerical combination locks, among others. Such traditional security measures, however, may be vulnerable to unauthorized attempts to access and operate the vehicles, and in some cases fail, allowing the vehicles to be stolen. Stolen vehicles may be disassembled into individual parts to be sold separately, making vehicle recovery impractical. The failure of traditional security measures can cause significant financial losses to a vehicle's owners (e.g., thousands of dollars per a stolen vehicle), which amounts to a multi-billion dollars loss in the aggregate. In some instances, owners may not be aware that their vehicles have been stolen until informed by law enforcement officers. Improving security measures against auto theft, generally, may include strengthening protections against unauthorized access, making it more difficult to breach the protections to discourage nefarious attempts to access (or operate) vehicles, deterring sales of individual parts from stolen vehicles, informing owners of unauthorized attempts to access vehicles, among other measures.

DETAILED DESCRIPTION

Figure 1:
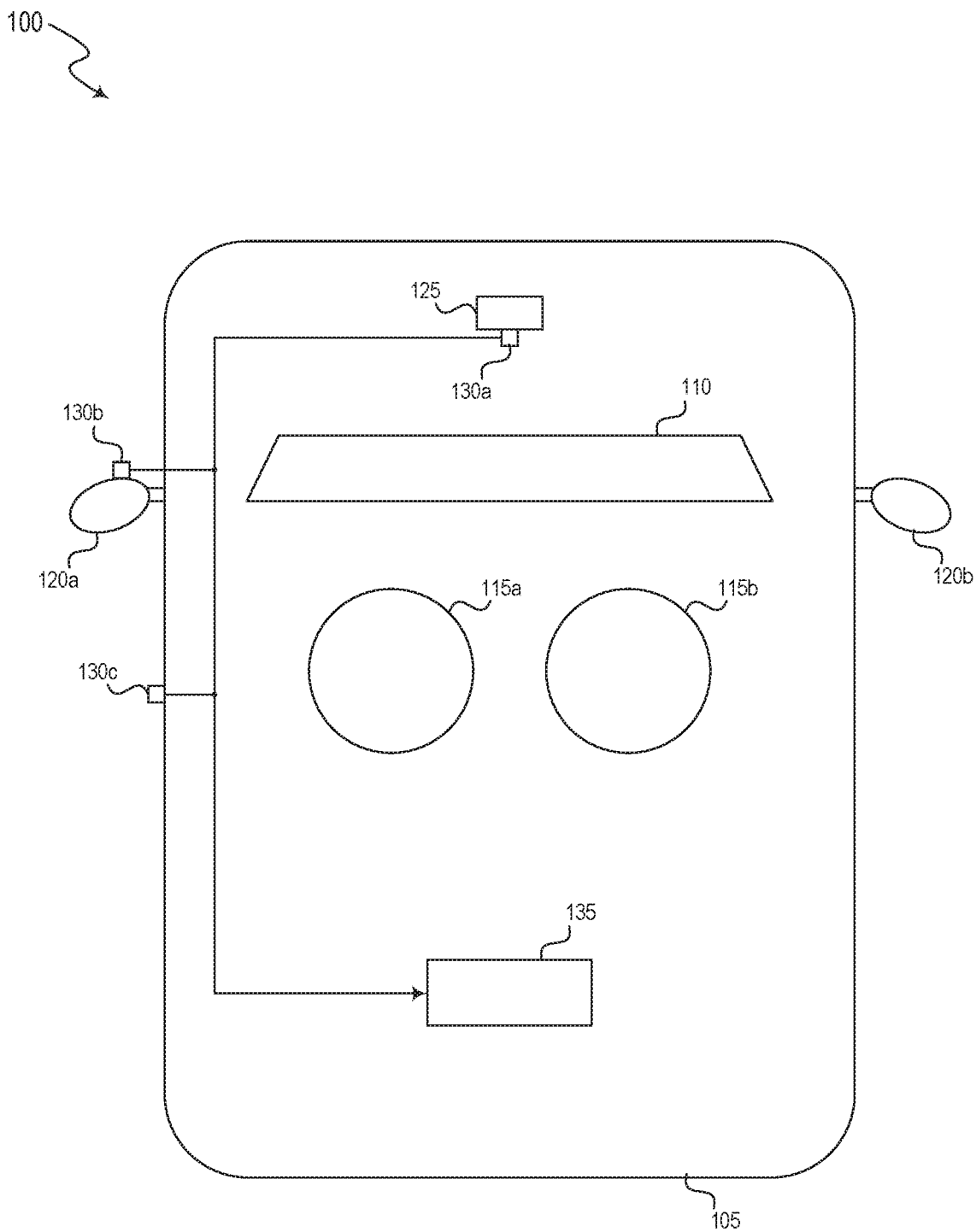
FIG. 1 is a block diagram illustrating a scheme of secure access to a vehicle, which supports providing security notification based on biometric identifiers in accordance with embodiments of the present technology.

A vehicle may be provided with various security measures to prevent or discourage unauthorized access to the vehicle. For example, a person may not enter into a passenger compartment or operate the vehicle (e.g., start the engine) without satisfying certain security measures, which may be based on his/her biometric identifiers in some cases, A biometric identifier may refer to a person's unique identification generated based on his/her biometric information—e.g., a fingerprint, a facial feature, a voice print, or a combination thereof. When the person is authorized to access (or operate) the vehicle, the security measures (e.g., security measures based on the person's biometric identifier) would allow the person to access the vehicle. When the person is not authorized to access the vehicle (e.g., an auto thief, other parties with nefarious intent), the security measures would deny the person from accessing the vehicle. The owner of the vehicle, however, may not be aware of such unsuccessful attempts to access the vehicle even if the nefarious party repeatedly attempts to unlock (or otherwise bypass or disarm) the security measures. It would be desirable to notify the owner of unsuccessful attempts as a security alert such that the owner may take appropriate actions, if necessary. It would further be desirable to store evidence (e.g., date and/or time of unsuccessful attempts, the unauthorized person's full-face photograph) related to such unsuccessful attempts, to facilitate prosecution of criminal activity.

Several embodiments of the present technology may facilitate providing security notification to an owner of a vehicle upon determining unsuccessful attempts by a person to access the vehicle. The vehicle may include security measures based on biometric identifiers. Such notification may include various information of the person collected during the unsuccessful attempts (e.g., biometric information, a full-face photograph) using sensing components of the vehicle, as well as several options for the owner to select based on learning such unsuccessful attempts. In some instances, the owner may choose to report the unsuccessful attempts to an authority (e.g., a public authority, a private security service), along with the biometric information of the person. In other instances, the owner may choose to permit the person to access the vehicle—e.g., when the owner identifies the person is a family member, a friend, or a mechanic repairing the vehicle, etc. When the owner determines that a risk of the person breaking into the vehicle is imminent, the owner may choose to trigger extra security measures to engage—e.g., remotely locking wheels of the vehicle, remotely disabling an electronic component that starts the engine.

In some embodiments, a secure access control device of a vehicle may collect biometric information of a person attempting to access the vehicle (e.g., a fingerprint, a facial feature, a voice print) using a sensing component coupled with the vehicle—e.g., as part of the security measures utilizing biometric identifiers. The sensing component (e.g., an on-board camera) may collect additional information about the person (e.g., a full-face photograph, characteristics about height, hair, build of the person, clothing the person wears). Subsequently, the secure access control device may generate a biometric identifier of the person based on the biometric information such that the secure access device may compare the biometric identifier of the person against a list of biometric identifiers of authorized users of the vehicle. The secure access control device may include a memory to store a list of biometric identifiers of the authorized users. The secure access control device may determine that the person is not authorized to access the vehicle and transmit a security notification to an owner of the vehicle (e.g., to the owner's mobile phone via SMS, to the owner's email account, etc.). Such a security notification may include the biometric information of the person (e.g., a fingerprint, a facial feature, a voice print), additional information from the sensing component (e.g., a full-face photograph), a set of options for the owner to select from, or a combination thereof.

A scheme of secure access to a vehicle, which supports providing security notification based on biometric identifiers in accordance with embodiments of the present technology, is described with reference to FIG. 1. Detailed descriptions of a secure access control unit (which may be referred to as a secure access device) that supports providing security notification based on biometric identifiers in accordance with embodiments of the present technology are provided with reference to FIG. 2, Further, FIG. 3 describes an apparatus that supports security notification based on biometric identifiers in accordance with embodiments of the present technology. Flowcharts illustrating methods that support security notification based on biometric identifiers in accordance with embodiments of the present technology are described with reference to FIGS. 4 and 5.

FIG. 1 is a block diagram 100 illustrating a scheme of secure access to a vehicle, which supports providing security notification based on biometric identifiers in accordance with embodiments of the present technology. The diagram 100 includes a vehicle 105 that includes a dashboard 110, passenger seats 115a and 115b (collectively, "passenger seats 115"), side mirrors 120a and 120b (collectively, "side mirrors 120"), a back mirror 125, and sensing components 130a through 130c (collectively, "sensing components 130"). The sensing components 130 may be configured to collect various biological traits of a user of the vehicle 105 (or a person attempting to access the vehicle 105) and may be referred to as biological sensing components. The biological traits may include a fingerprint, a facial feature, a voice print, or a combination thereof.

In some embodiments, the sensing components 130 may be internal to the vehicle 105 (e.g., in a passenger compartment of the vehicle 105). The diagram 100 depicts a sensing component 130a attached to the back mirror 125 (or integrated as a portion of the back mirror 125). In some cases, a sensing component 130a includes a camera positioned to take a picture of a user (e.g., a driver in the passenger seat 115a) or otherwise capture a facial feature of the user. Additionally, or alternatively, the sensing component 130a may include a microphone that collects a voice print of the user. Further, the sensing component 130a may include a fingerprinting unit that takes a fingerprint of the user. The sensing component 130a may be located in other places within the passenger compartment, suitable for collecting such biological traits—e.g., over the dashboard 110 (or integrated as part of dashboard 110), on a steering wheel, attached to a ceiling of the passenger compartment, etc.

In some embodiments, the sensing components 130 may be external to the vehicle 105 (e.g., outside of the passenger compartment). The diagram 100 depicts a sensing component 130b attached to the side mirror 120a (or integrated as a portion of the side mirror 120a). As described above, the sensing component 130b may be configured to collect various biological traits of a user of the vehicle 105—e.g., including a camera, a microphone, a fingerprinting unit, or the like. The diagram 100 also depicts a sensing component 130c attached to a sidewall of the vehicle 105 (or located integral or proximate to a door handle of the vehicle 105). The sensing component 130c may also include a camera, a microphone, and/or a fingerprinting unit, to collect various biological traits of a user of the vehicle 105. In some cases, the sensing components external to the vehicle (e.g., the sensing component 130b, the sensing component 130c) may be utilized to prohibit the person attempting to access the vehicle 105 from entering into the passenger compartment.

In some cases, certain biological traits of the user may be collected using a sensing component that is separate from the vehicle 105—e.g., a mobile phone of the user. The separate sensing component may also include a camera, a microphone, and/or a fingerprinting unit, which are configured to collect various biological traits of a user of the vehicle 105. In some embodiments, the secure access control unit 135 includes an adapting component (e.g., a receptacle) that is configured to enable the separate sensing component such that the separate sensing component can communicate with the secure access control unit 135.

In some embodiments, multiple biological traits of the user may be collected (e.g., using a common sensing component, using different sensing components) and/or combined—e.g., to increase reliability of the secure access to the vehicle 105. For example, the sensing component 130a may collect a facial feature (e.g., a first biological trait) and a voice print (e.g., a second biological trait) such that the identification (e.g., a biometric identifier) of the user may be generated based on both the facial feature and the voice print—e.g., two biological traits collected using the same sensing component. In another example, the sensing component 130a may collect a facial feature (e.g., a first biological trait), and the sensing component 130c may collect a fingerprint (e.g., a second biological trait) such that the identification (e.g., a biometric identifier) of the user may be generated based on both the facial feature and the fingerprint—e.g., two biological traits collected using the different sensing components. Further, in some embodiments, the sensing components 130 may be configured to collect additional information about the user of the vehicle 105 or the person attempting to access the vehicle 105 (e.g., a full-face photograph, characteristics about height, hair, build of the person, clothing the person wears).

The diagram 100 includes a secure access control unit 135 coupled with the sensing components 130. In some cases, the secure access control unit 135 may be configured to generate an identification of the user based on the biological traits of the user collected using the sensing components 130. Such identification (which may also be referred to as biometric identifiers) may include a set of digitized information (e.g., processed by analog-to-digital converters, pattern-recognition devices and/or algorithms, other hardware and/or software known to one skilled in the relevant art) generated from the biological traits collected using the sensing components 130. In some cases, the secure access control unit 135 may include an encoding component coupled with the sensing components 130, where the encoding component is configured to generate the set of digitized information. In some cases, the sensing components 130 may be configured to generate the identification (e.g., the biometric identifier) of the user based on the biological trait of the user. In such cases, the sensing components 130 may provide the identification of the user to the secure access control unit 135.

The secure access control unit 135 may determine whether a set of identifications (e.g., biometric identifiers) of authorized users of the vehicle 105 includes the identification of the user (e.g., the biometric identifier of the person attempting to access the vehicle). The set of identifications of the authorized users may be stored in a memory of the secure access control unit 135. In this regard, the secure access control unit 135 may compare the identification of the person attempting to access the vehicle 105 with the identifications of authorized users. The secure access control unit 135, when the set of identifications of authorized users does not include the identification of the user (i.e., the biometric identifier of the person attempting to access the vehicle does not correspond to or match with any of the biometric identifiers of the authorized users), may determine that the person is not authorized to access the vehicle 105 and/or prohibit the person from accessing and/or operating the vehicle 105—e.g., entering into the passenger compartment and/or starting the engine of the vehicle 105.

In some cases, the secure access control unit 135 may transmit a notification (e.g., a security notification) to an owner of the vehicle after the determination—e.g., to a mobile device of the owner, an email account of the owner. Such a notification may include a combination of the biometric information (e.g., the person's a fingerprint, a facial feature, a voice print, or a combination thereof), additional information from the sensing component (e.g., a full-face photograph of the person), a set of options for the owner to select from upon receiving the notification. In some cases, the set of options includes sending the biometric information to a public authority and/or a private security service, permitting the person to access the vehicle, locking the vehicle, or a combination thereof. In some cases, the secure access control unit 135 may generate a data packet including a geographical location of the vehicle (e.g., determined by a global positioning system (GPS) of the vehicle 105), an official vehicle identification number (VIN) of the vehicle 105, current date and/or time, a quantity of unsuccessful attempts by the person to access the vehicle, or a combination thereof, such that the data packet may be included in the notification.

In some cases, the secure access control unit 135 may transmit, without an input from the owner, the notification to a public authority and/or a private security service after the determination. In some cases, the secure access control unit 135 may transmit the notification to the owner after the person making a predetermined quantity of unsuccessful attempts to access the vehicle 105. Further, the secure access control unit 135 may record a total quantity of unsuccessful attempts to access the vehicle 105 by the person.

In some cases, the secure access control unit 135 may determine to engage additional security measures—e.g., when the person continues to attempt to access the vehicle 105 despite the secure access control unit 135 denying the person's access. In some embodiments, the secure access control unit 135 may electronically and/or mechanically shut down the vehicle 105 so as to prohibit the person from operating the vehicle 105 in any event—e.g., breaking into the passenger compartment. For example, the secure access control unit 135 may disable an electronic component coupled with an engine of the vehicle 105, where the electronic component is configured to activate the engine. Additionally, or alternatively, the secure access control unit 135 may lock one or more wheels of the vehicle 105 (e.g., mechanically prohibiting or hindering the wheels from rolling or otherwise immobilizing the vehicle 105).

In some cases, upon determining that a predetermined quantity of unsuccessful attempts (e.g., a predetermined threshold configured to trigger shutting down the vehicle 105) has been made by the person (e.g., the person's third attempts to access the vehicle 105 is unsuccessful when the predetermined quantity corresponds to three (3)), the secure access control unit 135 may disable the electronic component and/or lock the one or more wheels of the vehicle 105. Further, the secure access control unit 135 may disable the sensing components 130 such that additional attempts (e.g., fourth or fifth attempts) may be blocked. Additionally, or alternatively, the secure access control unit 135 may activate an alarm sounding component of the vehicle 105 and/or activate a location tracking system of the vehicle 105. In some embodiments, the owner (using the secure access control unit 135) may determine the predetermined quantity of unsuccessful attempts—e.g., one (1), two (2), four (4), five (5), or even a greater quantity.

In some embodiments, the secure access control unit 135 may be configured to manage various situations associated with controlling secure access to the vehicle 105. For example, the secure access control unit 135 may update the set of identifications of authorized users of the vehicle 105—e.g., adding (or deleting) a person to (or from) the authorized users of the vehicle. In some instances, the owner, in response to receiving the security notification, may permit the person to access the vehicle. In such instances, the secure access control unit 135 may add the biometric identifier of the person to the list of biometric identifiers of the authorized users of the vehicle 105. Also, the secure access control unit 135 may temporarily disable the features of secure access to allow access to the vehicle 105 without an authentication—e.g., when the vehicle 105 is in a repair shop or requires maintenance by a mechanic. Further, when the vehicle is sold to another legitimate owner, the secure access control unit 135 may delete all identifications of authorized users established by a previous owner and compile a new list of identifications of authorized users that the new owner establishes.

Figure 2:
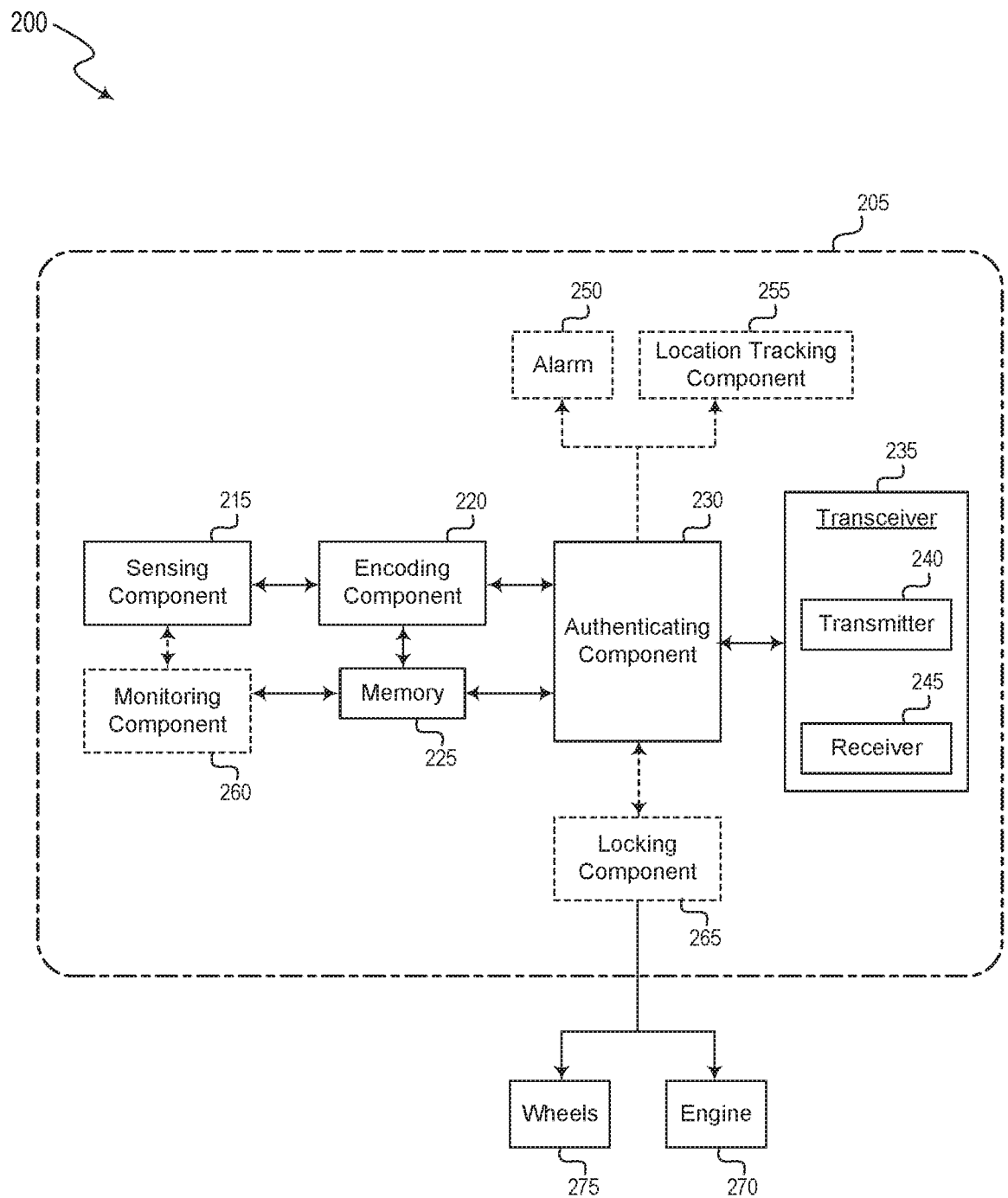
FIG. 2 is a block diagram schematically illustrating a secure access control unit that supports providing security notification based on biometric identifiers in accordance with embodiments of the present technology.

FIG. 2 is a block diagram 200 schematically illustrating a secure access control unit that supports providing security notification based on biometric identifiers in accordance with embodiments of the present technology. The diagram 200 includes a secure access control unit 205, which may be an example of or include an aspect of the secure access control unit 135 described with reference to FIG. 1. The secure access control unit 205 of the diagram 200 includes a sensing component 215 (which may be an example of or include aspects of the sensing components 130 described with reference to FIG. 1), an encoding component 220, a memory 225, an authenticating component 230, a transceiver 235 including a transmitting component 240 (which may be referred to as a transmitter) and a receiving component 245 (which may be referred to as a receiver). Further, the secure access control unit 205 may include an alarm sounding component 250 (or an alarm 250), a location tracking component 255, a monitoring component 260, and a locking component 265, which may be further coupled with an engine 270 and/or one or more wheels 275 of a vehicle (e.g., the vehicle 105).

The sensing component 215 (e.g., the sensing components 130) may be coupled with a vehicle and configured to collect various information of a person attempting to access the vehicle as described with reference to FIG. 1. The information of the person that the sensing component 215 may collect includes biometric information such as a fingerprint, a facial feature, a voice print; or the like (e.g., biological traits suitable for identifying a person), and/or information about the person such as a full-face photograph; characteristics about height; hair; build of the person, clothing the person wears, among others. In some cases, the authenticating component 230 may deactivate the sensing component 215 after determining that the person is not authorized to access the vehicle—e.g., blocking the person from repeatedly attempting to access the vehicle using the sensing component 215. In some cases; the authenticating component 230 may spontaneously deactivate the sensing component 215 to access the vehicle by the person. In some cases; the owner; in response to receiving the notification, may remotely deactivate the sensing component 215, via the authenticating component 230 (and the transceiver 235).

The encoding component 220 may be coupled with the sensing component 215 and may be configured to generate a biometric identifier (e.g., an identification) of the person based on the biometric information collected by the sensing component 215, The encoding component 220 may include analog-to-digital converters, pattern-recognition devices and/or algorithms, or other hardware and/or software known to one skilled in the relevant art to convert the biometric information (e.g., biological traits) to a set of digitized information, in some cases. Additionally, or alternatively, the encoding component 220 may include (or collaborate with) an artificial intelligence engine and/or algorithm to facilitate generating such identification—e.g., perceiving distinctive features or patterns from the biological traits to include in the identification. In some cases, the sensing component 215 may include the encoding component 220. In other cases, the authenticating component 230 may include the encoding component 220.

The memory 225 may be configured to store one or more biometric identifiers of authorized users of the vehicle, where the one or more biometric identifiers are generated based on biological traits of the authorized users. Further, the memory 225 may store the additional information of a person attempting to access the vehicle—e.g., a full-face photograph, characteristics about height, hair, build of the person, clothing the person wears. Additionally, or alternatively, the memory 225 may store a total quantity of unsuccessful attempts made by the person to access the vehicle—e.g., using the sensing component 215. In this regard, the monitoring component 260 may be coupled to the sensing component 215 and to the memory 225, where the monitoring component 260 is configured to count the total quantity of unsuccessful attempts to access the vehicle.

The authenticating component 230 may be coupled with the encoding component 220 and with the memory 225. Also, the authenticating component 230 may be configured to determine whether the person is authorized to access the vehicle. In this regard, the authenticating component 230 may determine whether the one or more biometric identifiers stored in the memory 225 include the biometric identifier of the person attempting to access the vehicle. When the authenticating component 230 determines that the one or more biometric identifiers do not include the biometric identifier of the person, the authenticating component 230 may, in conjunction with the transceiver 235 (e.g., the transmitting component 240), transmit a notification to an owner of the vehicle (e.g., a mobile device of the owner, an email account of the owner). Such a notification may include the information of the person attempting to access the vehicle and a set of options for the owner to select from. In some cases, the authenticating component 230 may include (or collaborate with) an artificial intelligence engine and/or algorithm that assists determining whether the biometric identifier of the person matches with any one of biometric identifiers of the authorized users—e.g., recognizing an anomaly in the biometric identifiers of the person for a swift determination to deny access to the vehicle.

In some embodiments, the authenticating component 230 may be configured to transmit (via the transmitting component 240 of the transceiver 235), without an input from the owner, the notification to a public authority and/or a private security service after determining that the person is not authorized to access the vehicle. Further, the authenticating component 230 may generate a data packet including a geographical location of the vehicle, an official vehicle identification number (VIN) of the vehicle, current date and/or time, a quantity of unsuccessful attempts by the person to access the vehicle, or a combination thereof, such that the authenticating component 230 may include the data packet in the notification.

The alarm sounding component (or the alarm) 250 may be configured to generate a sound—e.g., to deter recurring unauthorized attempts by the person to access the vehicle. In some cases, the authenticating component 230 may activate the alarm sounding component 250 after determining that the person is not authorized to access the vehicle. In some cases, the authenticating component 230 may activate the alarm sounding component 250 after a predetermined quantity of unsuccessful attempts (e.g., after three (3) unsuccessful attempts) made by the person to access the vehicle. In some cases, the owner, in response to receiving the notification, may remotely activate the alarm sounding component 250, via the authenticating component 230 (and the transceiver 235).

The location tracking component 255 may be configured to track a location of the vehicle—e.g., based on a global positioning system (GPS), in some examples, to track geographical locations of the vehicle. In some cases, the authenticating component 230 may activate the location tracking component 255 after determining that the person is not authorized to access the vehicle. In some cases, the authenticating component 230 may activate the location tracking component 255 after a predetermined quantity of unsuccessful attempts (e.g., after three (3) unsuccessful attempts) made by the person to access the vehicle. In some cases, the owner, in response to receiving the notification, may remotely activate the location tracking component 255, via the authenticating component 230 (and the transceiver 235).

The locking component 265 may be coupled with the authenticating component 230. In some cases, the locking component 265 may prohibit the person from operating the vehicle, when the authenticating component 230 determines that the person is not authorized to access the vehicle. In some cases, the authenticating component 230 may activate the locking component 265 after a predetermined quantity of unsuccessful attempts (e.g., after three (3) unsuccessful attempts) made by the person to access the vehicle. In some cases, the owner, in response to receiving the notification, may remotely activate the locking component 265, via the authenticating component 230 (and the transceiver 235).

In some embodiments, the locking component 265 may include (or coupled with) an electronic component that is coupled with the engine 270 of the vehicle. The electronic component may be activated to start the engine only when the authenticating component 230 determines that the person is authorized to access the vehicle based on his/her biometric identifier—e.g., the electronic component may be deactivated to prevent the engine from starting. Additionally, or alternatively, the locking component 265 may lock (or otherwise immobilize) one or more wheels 275 of the vehicle when the authenticating component 230 determines that the person is not authorized to access the vehicle based on his/her biometric identifier. In this manner, the locking component 265 may shut down the vehicle (e.g., deactivating the electronic component that starts the engine 270, immobilizing one or more wheels 275) as security measures to engage.

The receiving component 245 of the transceiver 235 may be configured to receive a signal from the owner, where the signal may correspond to an option that the owner selects from the set of options included in the notification. Further, the transmitting component 240 of the transceiver 235 may be configured to transmit the notification to a public authority, a private security service, a mobile device of the owner, an account of the owner, or a combination thereof.

Figure 3:
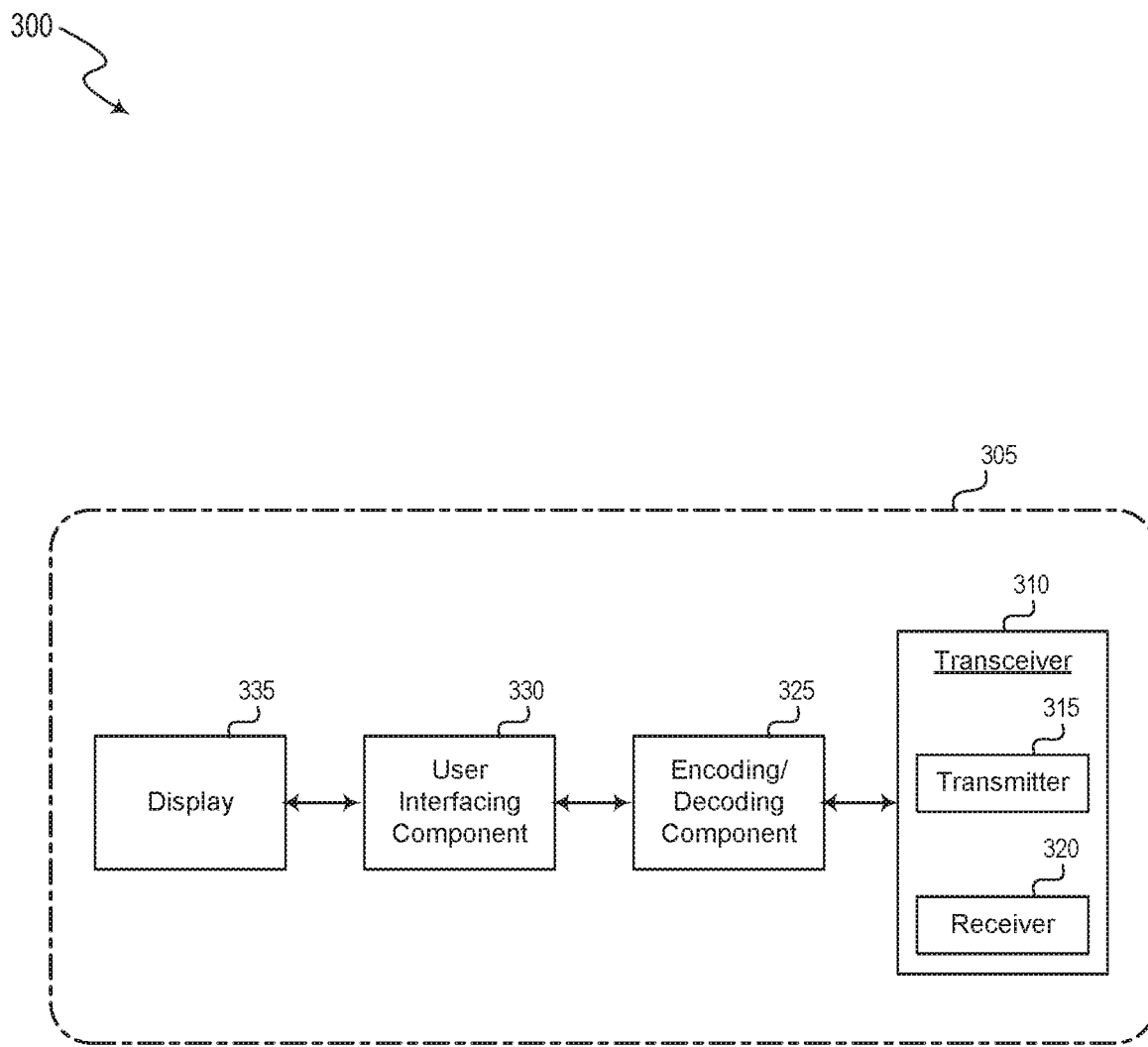
FIG. 3 is a block diagram schematically illustrating an electronic apparatus that supports security notification based on biometric identifiers in accordance with embodiments of the present technology.

FIG. 3 is a block diagram 300 schematically illustrating an electronic apparatus that supports security notification based on biometric identifiers in accordance with embodiments of the present technology. The diagram 300 includes a remote secure access controller 305, which may be part of a mobile device (e.g., a cellular phone) of an owner of a vehicle that supports providing security notification based on biometric identifiers in accordance with embodiments of the present technology. The remote secure access controller 305 includes a transceiver 310 including a transmitter 315 and a receiver 320, an encoding/decoding component 325, a user interface component 330, and a display 335.

The remote secure access controller 305 may receive a notification from a secure access device (e.g., the secure access control unit 135, the secure access control unit 205) of a vehicle (e.g., the vehicle 105), where the notification includes information of an unauthorized person attempting to access the vehicle and a set of options to select from. The information of the unauthorized person may include biometric information of the person including a fingerprint, a facial feature, a voice print, or a combination thereof (e.g., biological traits suitable for identifying a person), and/or additional information of the person (e.g., a full-face photograph of the person) as described with reference to FIGS. 1 and 2.

The encoding/decoding component 325 may decode the notification and/or the information about the unauthorized person included in the notification. Subsequently, the remote secure access controller 305 may display the information on the display 335 (e.g., the full-face photograph, the biometric information of the person). Thereafter, the remote secure access controller 305 may collect an input corresponding to an option of the set included in the notification, from the owner of the vehicle. In some cases, the remote secure access controller 305 may transmit, to the secure access device of the vehicle, a signal including a permission for the unauthorized person to access the vehicle, when the input corresponds to permitting the unauthorized person. In other cases, the remote secure access controller 305 may transmit, to the secure access device of the vehicle, a signal including an instruction for the secure access device to lock the vehicle, when the input corresponds to locking the vehicle. In some cases, the remote secure access cant oiler 305 may transmit the notification to a public authority and/or a private security service, when the input corresponds to reporting the unauthorized person attempting to access the vehicle.

Figure 4:
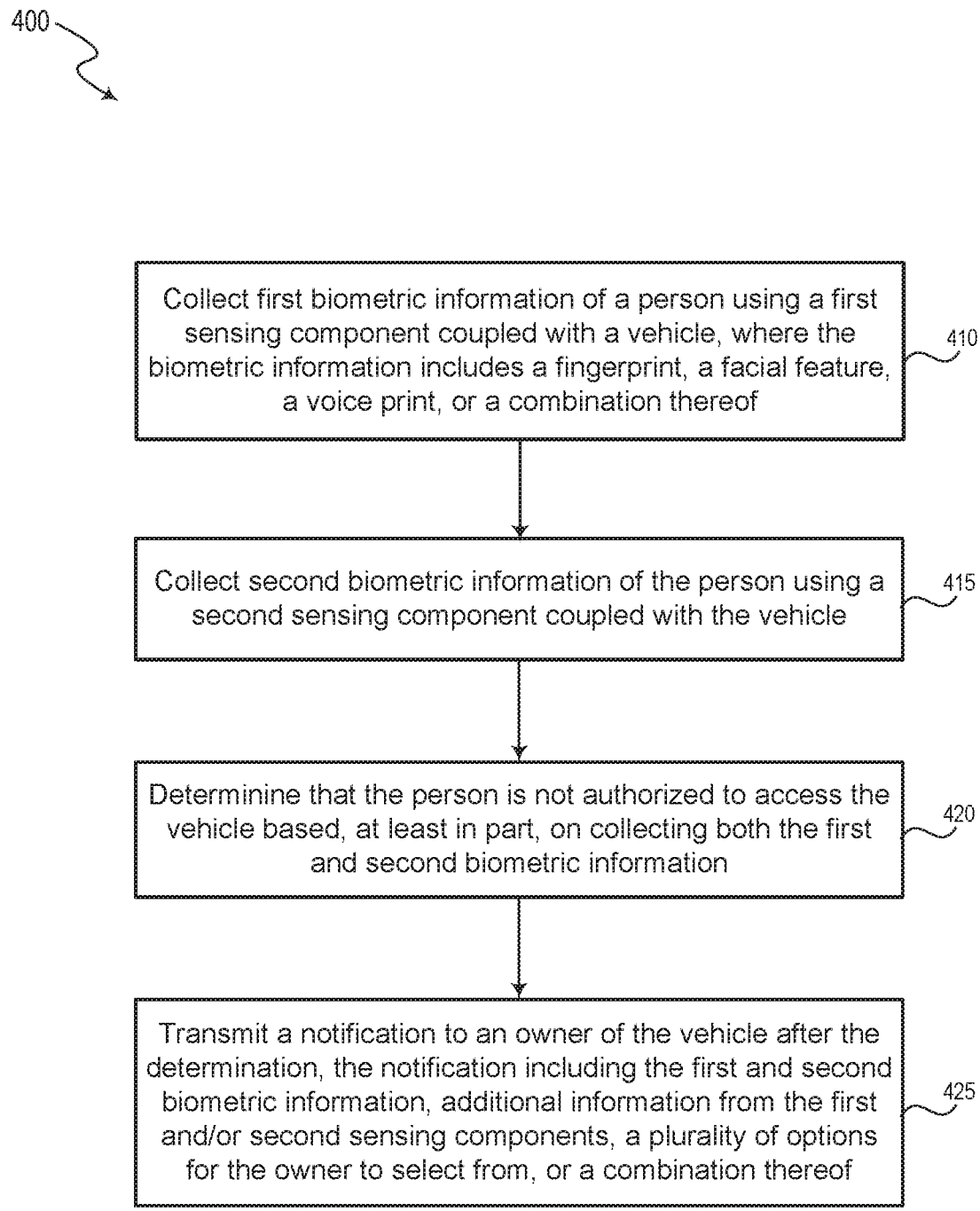
FIGS. 4 and 5 are flowcharts illustrating methods that support providing security notification based on biometric identifiers in accordance with embodiments of the present technology.

FIG. 4 is a flowchart 400 illustrating a method that supports providing security notification based on biometric identifiers in accordance with embodiments of the present technology. The flowchart 400 may be an example of or include aspects of a method that a secure access control unit (e.g., the secure access control unit 135, the secure access control unit 205) may perform as described with reference to FIGS. 1 and 2.

The method includes collecting first biometric information of a person using a first sensing component coupled with a vehicle, where the biometric information includes a fingerprint, a facial feature, a voice print, or a combination thereof (box 410). In accordance with one aspect of the present technology, the collecting feature of box 410 can be performed by a secure access control unit (e.g., the secure access control unit 135 or the secure access control unit 205), in conjunction with the sensing component 130 or the sensing component 215 described with reference to FIGS. 1 and 2.

The method further includes collecting second biometric information of the person using a second sensing component coupled with the vehicle (box 415). In accordance with one aspect of the present technology, the collecting feature of box 415 can be performed by a secure access control unit (e.g., the secure access control unit 135 or the secure access control unit 205), in conjunction with the sensing component 130 or the sensing component 215 described with reference to FIGS. 1 and 2.

The method further includes determining that the person is not authorized to access the vehicle based, at least in part, on collecting both the first and second biometric information (box 420). In accordance with one aspect of the present technology, the determining feature of box 420 can be performed by a secure access control unit (e.g., the secure access control unit 135 or the secure access control unit 205), in conjunction with the authenticating component 230 described with reference to FIGS. 1 and 2.

The method further includes transmitting a notification to an owner of the vehicle after the determination, the notification including the first and second biometric information, additional information from the first and/or second sensing components, a set of options for the owner to select from, or a combination thereof (box 425). In accordance with one aspect of the present technology, the transmitting feature of box 425 can be performed by a secure access control unit (e.g., the secure access control unit 135 or the secure access control unit 205), in conjunction with the transceiver 235 described with reference to FIGS. 1 and 2.

In some embodiments, the method may further include generating a data packet including a geographical location of the vehicle, an official vehicle identification number (VIN) of the vehicle, current date and/or time, a quantity of unsuccessful attempts by the person to access the vehicle, or a combination thereof, where the notification includes the data packet. In some embodiments, the additional information from the first and/or second sensing components includes a full-face photograph of the person. In some embodiments, the set of options includes sending the first and second biometric information to a public authority and/or a private security service, permitting the person to access the vehicle, locking the vehicle, or a combination thereof.

In some embodiments, the method further includes adding a biometric identifier of the person to one or more biometric identifiers of authorized users of the vehicle in response to the owner selecting to permit the person to access the vehicle, where the biometric identifier of the person is generated based on the first and second biometric information. In some embodiments, the method further includes transmitting, without an input from the owner, the notification to a public authority and/or a private security service after the determination. In some embodiments, transmitting the notification to the owner includes transmitting the notification to a mobile device of the owner, an account of the owner, or both.

In some embodiments, the method further includes deactivating the first and/or second sensing components after a predetermined quantity of unsuccessful attempts to access the vehicle by the person. In some embodiments, the method further includes activating an alarm sounding component of the vehicle after a predetermined quantity of unsuccessful attempts to access the vehicle by the person. In some embodiments, the method further includes activating a location tracking system of the vehicle after a predetermined quantity of unsuccessful attempts to access the vehicle by the person. In some embodiments, the method further includes locking the vehicle after a predetermined quantity of unsuccessful attempts to access the vehicle by the person. In some embodiments, the method further includes recording a total quantity of unsuccessful attempts after a predetermined quantity of unsuccessful attempts to access the vehicle by the person.

Figure 5:
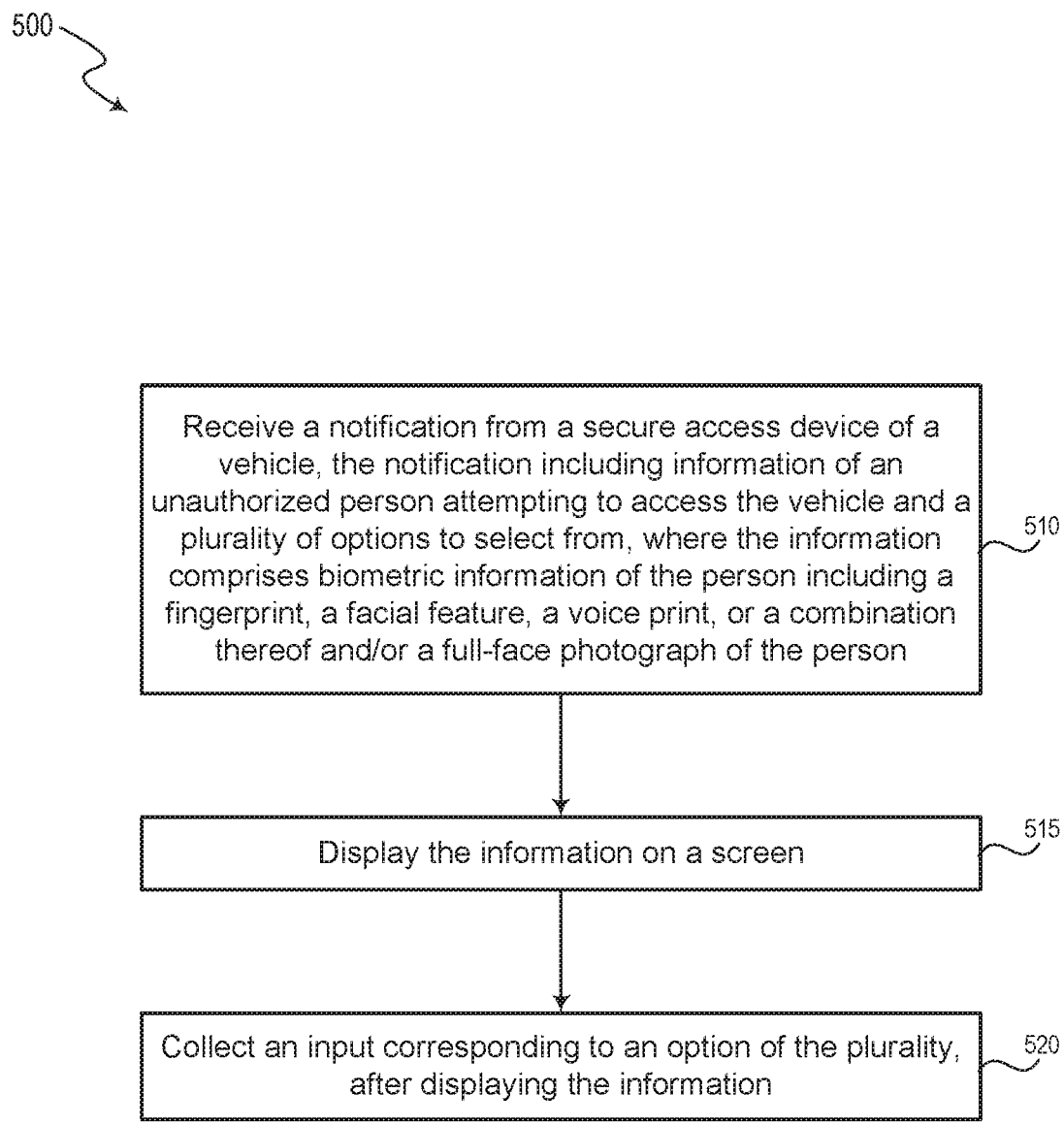

FIG. 5 is a flowchart 500 illustrating a method that supports providing security notification based on biometric identifiers in accordance with embodiments of the present technology. The flowchart 500 may be an example of or include aspects of a method that a remote secure access controller (e.g., the remote secure access controller 305) may perform as described with reference to FIGS. 1 through 3.

The method includes receiving a notification from a secure access device of a vehicle, the notification including information of an unauthorized person attempting to access the vehicle and a set of options to select from, where the information comprises biometric information of the person including a fingerprint, a facial feature, a voice print, or a combination thereof and/or a full-face photograph of the person (box 510). In accordance with one aspect of the present technology, the receiving feature of box 510 can be performed by a remote secure access controller (e.g., the remote secure access controller 305), in conjunction with a transceiver 310 in some cases, as described with reference to FIGS. 1 through 3.

The method includes displaying the information on a screen (box 515). In accordance with one aspect of the present technology, the displaying feature of box 515 can be performed by a remote secure access controller (e.g., the remote secure access controller 305), in conjunction with the display 335, as described with reference to FIGS. 1 through 3.

The method includes collecting an input corresponding to an option of the set, after displaying the information (box 520). In accordance with one aspect of the present technology, the collecting feature of box 520 can be performed by a remote secure access controller (e.g., the remote secure access controller 305) as described with reference to FIGS. 1 through 3.

In some embodiments, the method may further include transmitting, to the secure access device, a signal including a permission for the unauthorized person to access the vehicle, when the input corresponds to permitting the unauthorized person. In some embodiments, the method may further include transmitting, to the secure access device, a signal including an instruction for the secure access device to lock the vehicle, when the input corresponds to locking the vehicle. In some embodiments, the method may further include transmitting the notification to a public authority and/or a private security service, when the input corresponds to reporting the unauthorized person attempting to access the vehicle.

Several embodiments of the present technology are directed to provide various levels of security against unauthorized access to a vehicle based on biometric identifiers and/or providing security notification based on the biometric identifiers to the owner of the vehicle. Although the present technology is described with respect to providing security to access to a vehicle, the present technology is not limited thereto. For example, the security features using biometric identifiers may be implemented to provide security to other apparatuses, such as construction equipment, motor cycles, boats, planes, or the like. Further, although in the foregoing examples, sensing components have been described and illustrated as collecting facial features, voice prints, fingerprints, and/or combinations thereof, in other embodiments, additional and/or alternative biological traits could be collected. For example, three dimensional maps of portions of a user's body (e.g., face, head, etc.), palm prints, capillary structures (e.g., in a user's iris), etc. may also be collected and used as set forth above.

It should be noted that the methods described above describe possible implementations, and that the operations and the steps may be rearranged or otherwise modified and that other implementations are possible. Furthermore, embodiments from two or more of the methods may be combined.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A method, comprising:
collecting first biometric information of a person using a first sensing component coupled with a vehicle, wherein the first biometric information includes a fingerprint, a facial feature, a voice print, or a combination thereof;
collecting second biometric information of the person using a second sensing component coupled with the vehicle;
determining that the person is not authorized to access the vehicle based, at least in part, on collecting both the first and second biometric information; and
transmitting a notification to an owner of the vehicle after the determination, the notification including the first and second biometric information, additional information from the first and/or second sensing components, a data packet including a geographical location of the vehicle, an official vehicle identification number (VIN) of the vehicle, current date and time, a quantity of unsuccessful attempts by the person to access the vehicle, and a plurality of options for the owner to select from, wherein the plurality of options includes remotely immobilizing the vehicle based on receiving the owner's input.

2. The method of claim 1, wherein the additional information from the first and/or second sensing components comprises a full-face photograph of the person.

3. The method of claim 2, wherein the plurality of options further includes sending the first and second biometric information and the full-face photograph of the person to a public authority.

4. The method of claim 1, wherein the plurality of options further includes permitting the person to access the vehicle, the method further comprising:
adding a biometric identifier of the person to one or more biometric identifiers of authorized users of the vehicle in response to the owner selecting to permit the person to access the vehicle, wherein the biometric identifier of the person is generated based on the first and second biometric information.

5. The method of claim 1, further comprising:
transmitting, without an input from the owner, the notification to a public authority after the determination.

6. The method of claim 1, wherein transmitting the notification to the owner includes transmitting the notification to a mobile device of the owner, an account of the owner, or both.

7. The method of claim 1, further comprising:
deactivating the first and/or second sensing components after a predetermined quantity of unsuccessful attempts to access the vehicle by the person.

8. The method of claim 1, further comprising:
activating an alarm sounding component of the vehicle after a predetermined quantity of unsuccessful attempts to access the vehicle by the person.

9. The method of claim 1, further comprising:
activating a location tracking system of the vehicle after a predetermined quantity of unsuccessful attempts to access the vehicle by the person.

10. A method, comprising:
receiving a notification from a secure access device of a vehicle, the notification including first and second biometric information of a person collected using first and second sensing components of the vehicle, respectively, the biometric information including a fingerprint, a facial feature, a voice print, or a combination thereof, additional information from the first and/or second sensing components, a data Packet including a geographical location of the vehicle, an official vehicle identification number (VIN) of the vehicle, current date and time, a quantity of unsuccessful attempts by the person to access the vehicle, and a plurality of options for an owner of the vehicle to select from, wherein the plurality of options includes remotely immobilizing the vehicle based on receiving the owner's input;
displaying information included in the notification on a screen; and
collecting, from the owner, an input corresponding to an option of the plurality, after displaying the information.

11. The method of claim 10, wherein the additional information from the first and/or second sensing components comprises a full-face photograph of the person, the method further comprising:
transmitting, to the secure access device, a signal including instructions for the secure access device to send the full-face photograph to a public authority, when the input corresponds to sending the full-face photograph to the public authority.

12. The method of claim 10, further comprising:
transmitting, to the secure access device, a signal including instructions for the secure access device to immobilize the vehicle, when the input corresponds to immobilize the vehicle.

13. The method of claim 10, further comprising:
transmitting the notification to a public authority, when the input corresponds to reporting the person attempting to access the vehicle.

14. An apparatus, comprising:
a first sensing component coupled with a vehicle, the first sensing component configured to collect first biometric information of a person attempting to access the vehicle, the first biometric information including a fingerprint, a facial feature, a voice print, or a combination thereof;
a second sensing component coupled with the vehicle, the second sensing component configured to collect second biometric information of the person;
an encoding component coupled with the first and second sensing components, the encoding component configured to generate a biometric identifier of the person based on the first and second biometric information collected by the first and second sensing components;
a memory coupled with the encoding component, the memory configured to store one or more biometric identifiers of authorized users of the vehicle;
an authenticating component coupled with the encoding component and the memory, the authenticating component configured to determine whether the person is authorized to access the vehicle; and
a transmitting component coupled with the authenticating component, the transmitting component configured to transmit a notification to an owner of the vehicle, wherein the notification includes the first and second biometric information, additional information from the first and/or second sensing components, a data packet including a geographical location of the vehicle, an official vehicle identification number (VIN) of the vehicle, current date and time, and a quantity of unsuccessful attempts by the person to access the vehicle, and a plurality of options for the owner to select from, wherein the plurality of options includes remotely immobilizing the vehicle based on receiving the owner's input.

15. The apparatus of claim 14, further comprising:
a receiving component configured to receive a signal from the owner, the signal corresponding to an option that the owner selects from the plurality of options.

16. The apparatus of claim 14, further comprising at least one of:
an alarm sounding component configured to generate a sound when activated by the owner, the authenticating component, or both;
a location tracking system configured to track a location of the vehicle based on a global positioning system (GPS);
a monitoring component configured to count a total quantity of unsuccessful attempts to access the vehicle by the person; or
a locking component configured to immobilize the vehicle.

17. The method of claim 1, wherein remotely immobilizing the vehicle includes deactivating an electronic component coupled with an engine of the vehicle to prevent the engine from starting.

18. The method of claim 1, wherein remotely immobilizing the vehicle includes locking one or more wheels of the vehicle to prevent the vehicle from moving.

19. The apparatus of claim 16, wherein the locking component includes an electronic component coupled with an engine of the vehicle, the electronic component configured to be deactivated to prevent the engine from starting.

20. The apparatus of claim 16, wherein the locking component is configured to immobilize one or more wheels of the vehicle to prevent the vehicle from moving.

* * * * *